United States Patent
Lang

[11] 3,800,149
[45] Mar. 26, 1974

[54] ELECTRO-OPTICAL INFORMATION CONVERSION SYSTEM USING FIBER OPTICS

[75] Inventor: Paul Wentworth Lang, Hollywood, Calif.

[73] Assignee: Michael M. du Pont, Los Angeles, Calif.

[22] Filed: Jan. 29, 1973

[21] Appl. No.: 327,593

[52] U.S. Cl............ 205/205, 178/7.1, 250/219 CR, 250/227
[51] Int. Cl...... G01n 21/30, G02b 5/14, H04n 3/16
[58] Field of Search......... 250/219 Q, 219 CR, 227; 178/7.1

[56] References Cited
UNITED STATES PATENTS
| | | | |
|---|---|---|---|
| 3,036,153 | 5/1962 | Day | 250/219 CR |
| 3,104,324 | 7/1963 | Rabinow | 250/219 CR |
| 3,177,470 | 4/1965 | Galopin | 250/219 CR |

*Primary Examiner*—James W. Lawrence
*Assistant Examiner*—T. N. Grigsby
*Attorney, Agent, or Firm*—Pastoriza & Kelly

[57] ABSTRACT

An optical image is projected onto first ends of fiber optics, the second ends of the fiber optics being fanned out into an annular ring. A scanning disc having an opening successively picks up light from each second end of the fiber optics over a complete revolution, the light selected and passed through the opening in the disc being detected by a photocell to generate an electrical signal which may be stored on a magnetic tape. The optical scene may be reconstructed by modulating a light source with the electrical signal and passing the modulated light through the opening in the disc as it scans the fanned out second end of the fiber optics. The optical image is then reproduced at the first ends of the fiber optics from whence it may be projected onto a screen.

3 Claims, 3 Drawing Figures

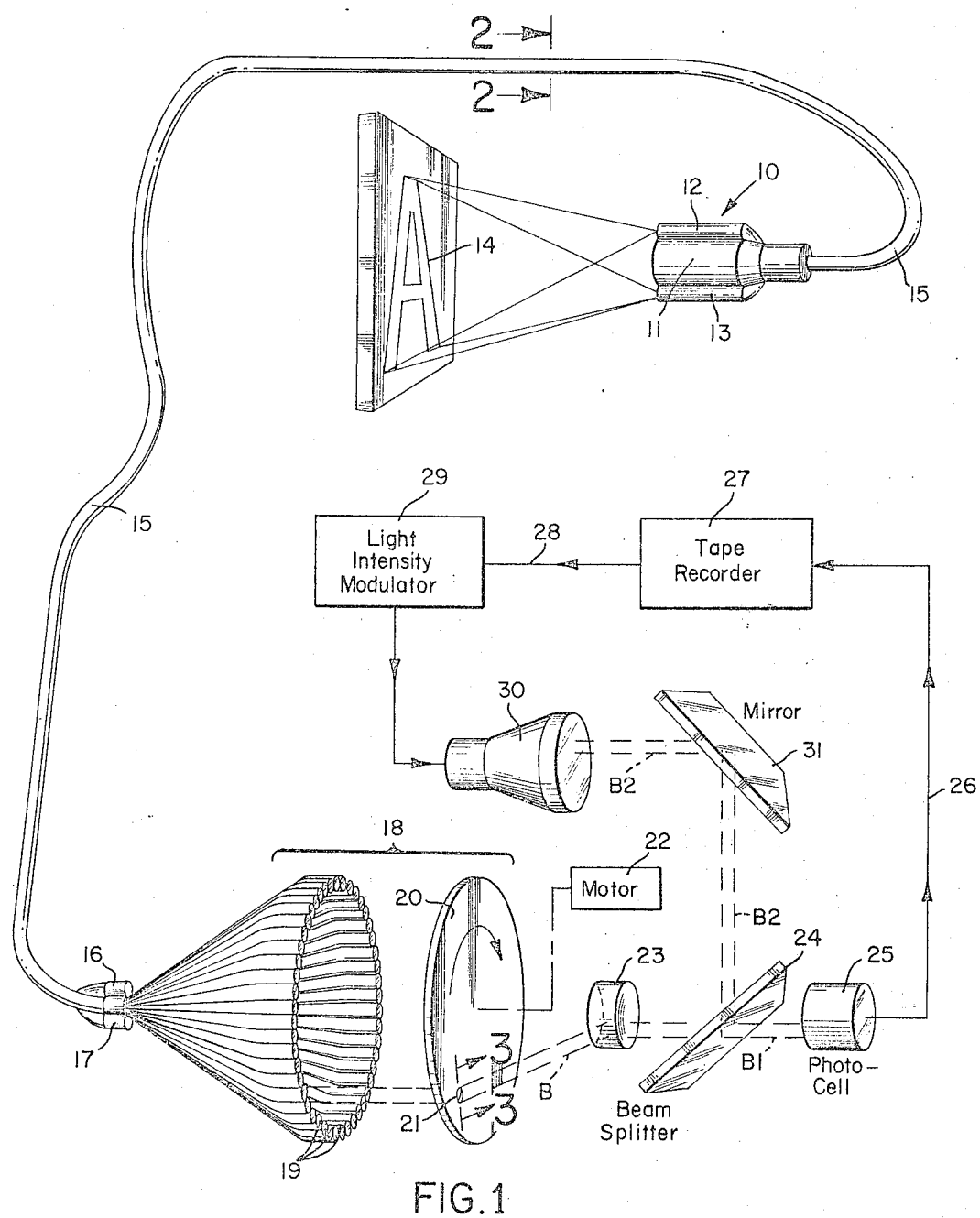
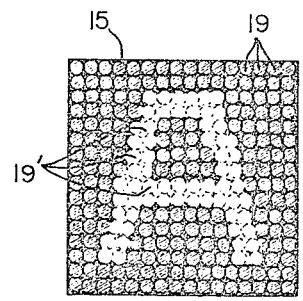
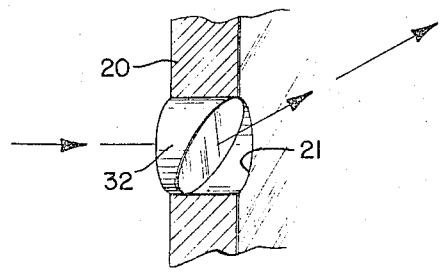
FIG.1
FIG.2
FIG.3

ELECTRO-OPTICAL INFORMATION CONVERSION SYSTEM USING FIBER OPTICS

This invention relates to an electro-optical system for converting information such as photographs, data sheets, or the like into electrical signals suitable for storage or transmission to a remote area.

BACKGROUND OF THE INVENTION

Presently known systems for storing information either in the form of written data, pictures, graphs or even actual scenes usually involve relatively expensive electronic equipment. One of the most widely used systems simply constitutes televising the particular information with a conventional type t.v. camera and recording the video signal on a magnetic tape. The information may then subsequently be reproduced by passing the magnetic tape signal into a television receiver.

BRIEF DESCRIPTION OF THE PRESENT INVENTION

The present invention is concerned with a highly simplified and inexpensive system for converting optical scenes or images into an electrical signal for storage purposes which avoids the use of bulky electronic equipment such as a television camera and receiver for reproduction of the information.

More particularly, the invention utilizes fiber optics wherein a light image is projected onto a matrix made up of first ends of a bundle of fiber optics so that the scene is optically carried by the fibers to their second ends. The second ends of the fibers are fanned out to define an annular ring of fiber ends and a single opening is then moved in a circular path in front of each of the fiber second ends making up the annular ring so that any light passing from the second ends of the fibers is successively passed through the opening. The light passing through the opening is detected by a photocell to provide an electrical signal which varies in accord with the relative light intensities successively passing through the opening. This resulting electrical signal may be recorded on a conventional cassette type tape recorder.

The scanning of the second fiber ends arranged in the annular ring can be accomplished by providing the single light opening in a rotating disc coaxially mounted relative to the annular ring. The same scanning system may be used to reconstruct the optical image by simply modulating the intensity of a light source, the modulated light passing through the opening in the disc as it scans the ends of the fibers. The optical signals are then carried by the fibers back to their first ends wherein the image will be reconstructed. This image can then be projected onto a screen.

The advantages of the foregoing system are numerous. Not only is bulky electronic equipment heretofore deemed necessary wholly eliminated with a consequence savings in cost and maintenance repairs, but additionally the picking up of the optical image can be accomplished with a very small type of pick up head located on the first ends of the fiber optics. Thus, normally inaccessible scenes or locations can be imaged onto the ends of the fiber optics for subsequent display or storage purposes. In this respect, the invention finds particular utility in the dental and medical field wherein the probe picking up an optical image may be received in a person's mouth or in other areas of the body.

BRIEF DESCRIPTION OF THE DRAWINGS

A better understanding of the invention will be had by referring to one embodiment thereof as schematically illustrated in the accompanying drawings in which:

FIG. 1 is a diagramatic showing partly in block form of the basic components making up the system of the present invention;

FIG. 2 is a cross section illustrating a matrix of fiber optics taken in the direction of the arrows 2—2 of FIG. 1; and FIG. 3 is a fragmentary cross section taken in the direction of the arrows 3—3 of FIG. 1.

DETAILED DESCRIPTION OF THE INVENTION

Referring to the upper portion of FIG. 1 there is designated generally by the numeral 10 a pick up head receiving first ends of a bundle of fiber optics and including a lens system 11 and co-operating illuminating means in the form of minute spotlights 12 and 13 mounted on either side of the lens system. These lights serve to illuminate an optical scene which, for purposes of illustration only, constitute the letter A on a screen 14. It should be understood that the optical scene represented by the letter could constitute a picture, data sheet, graph, or an outdoor scene. Because the pick up head 10 includes associated light sources and is very small and compact, the head may be moved into normally inaccessible places such as inside a patient's mouth or in other areas of the body to pick up optical information illuminated by the lights 12 and 13.

The first ends of the optical fibers connect to a bundle of fiber optics indicated at 15. Thus, the optical scene projected by the lens system 11 onto the first ends of the fibers is carried by the fibers in the bundle 15 to any convenient location wherein the conversion of the optical image into an electrical signal is accomplished. Since the bundle of fiber optics 15 is very flexible and the pick up or probing head 10 can be made very compact, great versitility is provided in the type of optical information that can be recorded.

Referring to the far end of the fiber optic bundle 15, it will be noted that there are provided two light sources 16 and 17 which may have associated with them individual fibers for transmitting light to the portions 12 and 13 on the head 10. These fibers would be independent of the other fibers carrying the optical image.

Referring to the far end of the fiber optics bundle 15 as shown in the lower portion of FIG. 1, there is provided a scanning system shown in exploded view by the numeral 18. Essentially, the scanning is accomplished by fanning out the second ends of the image carrying fibers into an annular ring as indicated at 19. A rotating disc 20 in turn includes an opening 21, the disc being rotated as by a motor 22 about an axis coaxial with the axis of the annular ring of fibers 19 and positioned in front of the annular ring such that each second end of the fibers is successively scanned by the opening 21.

It will be understood from the foregoing that the individual fibers are arranged in side by side relationship in the circular or ring pattern, the ring being only one fiber thick so that the opening 21 individually scans each fiber upon each revolution. If the disc is rotated at, for example, 24 revolutions per second, the entire matrix of fiber optics carrying the image will be scanned 24 times a second.

The detected light from the end of each fiber passing through the opening 21 is directed to a negative lens 23 from whence it passes axially through a beam splitter 24 to a photocell 25. The output from the photocell is in the form of an electrical signal which varies in accordance with the varying intensity of the light passing through the opening 21 on the scanning disc 20. This output is passed by line 26 to a tape recorder 27 which may constitute a conventional cassette type recorder. Alternatively, the electrical signal could be used to modulate a carrier radio signal for detection at a remote location.

The same fiber optics and scanning components of the apparatus of FIG. 1 may be utilized to reconstruct the optical image from the recorded electrical signal. Thus, there is indicated in FIG. 1 an output 28 from the tape recorder 27 which will pass the electrical signal into a light intensity modulator 29. Modulator 29 serves to modulate the intensity of a light source 30. This light source is directed by a mirror 31 to the beam splitter 24 back through the negative lens 23 to pass through the opening 21 and thus radiate successively the ends of the fibers 19 as the disc rotates. The respective light intensities are then transmitted by the fibers to the first ends of the fibers in the head 10. The lens system 11 may then be utilized to project the image formed onto the screen 14.

Referring to FIG. 2, there is illustrated in greatly exaggerated form in that there are many more fibers than those illustrated a cross section of the fiber optics bundle 15. Normally, the cross section is of a square configuration, the fibers themselves defining a matrix as illustrated. In the particular example chosen, it will be noted that the optical image of the letter A is carried by the fibers, the energized fibers themselves defining the particular letter as indicated at 19'.

FIG. 3 illustrates the manner in which light passing through the opening 21 may be directed towards the negative lens 23 in order that the light passing through the opening may be channeled in an axial direction for easy detection by the photocell 25. In the particular embodiment illustrated, the means for directing the light constitutes a wedge shaped lens 32 disposed in the opening 21 which will refract the light in a generally radially inwardly direction as indicated by the arrows.

OPERATION

The operation of the invention will be evident from the foregoing description. Initially, the light sources 16 and 17 at the second ends of the fiber optics are energized to provide illumination from the portions 12 and 13 mounted on the head 10, the fiber optics carrying the light so that a particular optical scene to be recorded is sufficiently illuminated. The lens system 11 then projects an image of the scene on the first ends of the various fibers which are arranged in a matrix such as illustrated in FIG. 2. The light and dark areas making up the optical scene are transmitted by the various fibers to the second ends 19.

The amount of light in each individual fiber is then successively detected by the scanning disc 20, the detected varying light being picked up by the photocell 25 and recorded as described.

In the playback or reconstruction of the optical image it will, of course, be understood that the scanning disc 10 must be rotated at precisely the same speed and in precisely the same phase relationship to the electrical signal as was the case when the signal was recorded. Thus, the signal modulates the intensity of the light source 30 as described heretofore so that the second ends of the fibers 19 are successively illuminated with a varying intensity light corresponding to their initial illumination when recording the original optical scene. This optical information is then transmitted by the fibers back to the head 10 wherein the lens 11 will project the image on the first ends of the fibers onto the screen 14. It will, of course, be understood that the light sources 16 and 17 are not used when reproducing the particular optical scene.

From the foregoing description, it will thus be evident that the present invention has provided an extremely simple and convenient arrangement for converting optical information into an electrical signal for either permanent storage or instantaneous playback.

It will also be understood, as mentioned heretofore, that the number of fibers illustrated in the drawings is substantially less than the actual number that would be used. Thus, by providing a very large number of fibers, very good fidelity is realizable in recording the optical scene. Moreover, it should be understood that by a simple color wheel and filters, the scene can be recorded in color and reproduced in color.

What is claimed is:

1. An apparatus for converting an optical scene into an electrical signal including, in combination:
   a. a bundle of fiber optics having first ends terminating in a common plane in closely spaced relationship to define a matrix;
   b. lens means positioned to project an optical scene on the plane of the matrix so that the scene is optically carried by the fibers to their second ends, the second ends being fanned out to define an annular ring of fiber ends;
   c. a disk having a single opening adjacent to its periphery;
   d. means for rotating the disk about an axis coaxial with the axis of the annular ring of fiber ends and in a position such that said opening successively passes the ends of the fibers so that each fiber is scanned once for each revolution of the disk;
   e. photocell means;
   f. a wedge shaped lens in said single opening for directing light passing into said opening towards the axis of said disk; and,
   g. a negative lens positioned on the axis to receive the light and direct it in the direction of the axis of the disk, said photocell means comprising a single photocell on said axis positioned to receive light from the negative lens for every rotative position of said disk to thereby provide an electrical signal which varies as a function of the variation in light intensity resulting from successive scanning and passing of the light from successive ends of the fiber optics in said annular ring to said photocell means.

2. An apparatus according to claim 1, including tape recorder means connected to said photocell means for recording said electrical signal on magnetic tape so that said optical scene may be stored in the form of information signals on said tape.

3. An apparatus according to claim 1, additionally including a light source; a light intensity modulator connected to said light source and responsive to an electrical signal to vary the intensity of the light source in accord with the variations in the electrical signal; and means for directing light from said source through said opening in said disc so that the second ends of the fibers are successively illuminated as said disc rotates whereby an optical image of a given optical scene from which an electrical signal is generated by said apparatus, is reconstructed on said matrix, said lens means functioning to project said optical image onto a screen.

* * * * *